R. J. KING.
Shovel-Plow.
No. 7,141.
Patented Mar. 5. 1850.
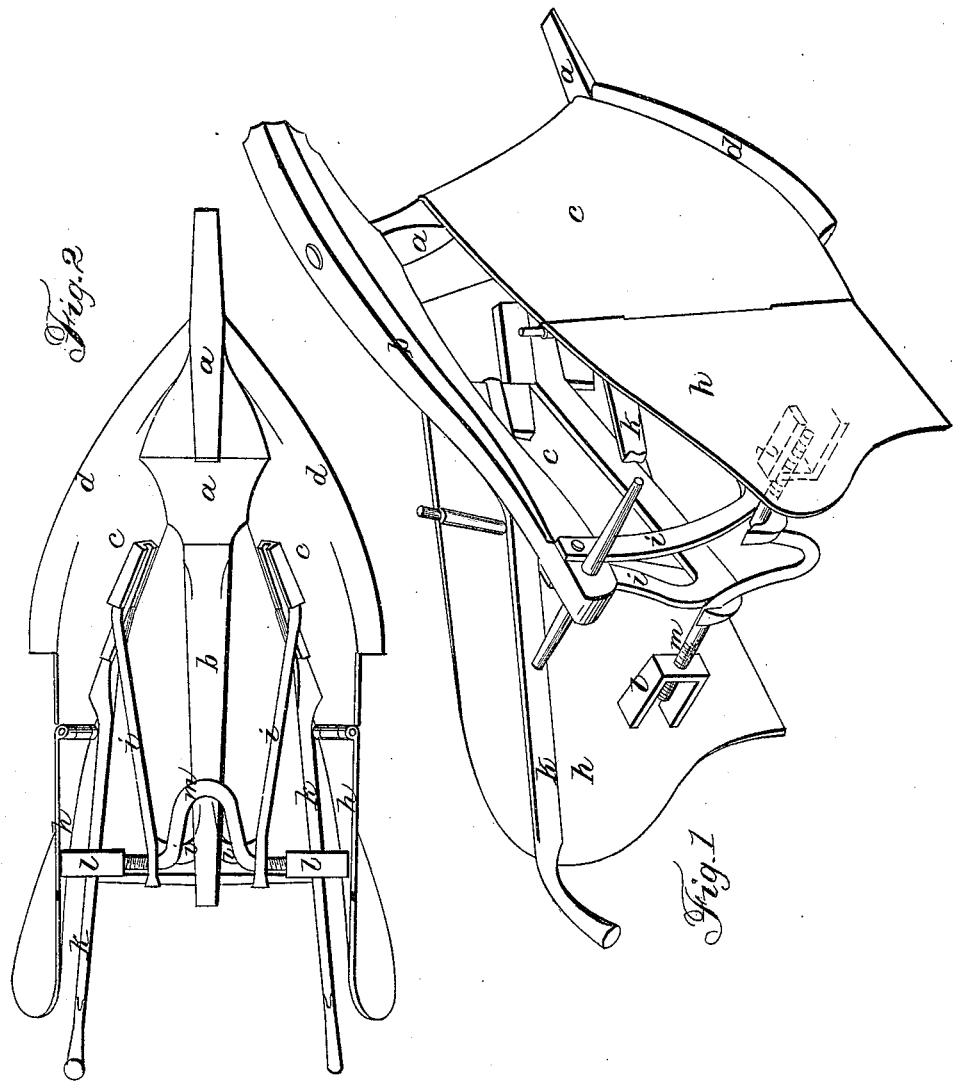

UNITED STATES PATENT OFFICE.

ROBERT J. KING, OF LANCASTER, PENNSYLVANIA.

IMPROVEMENT IN CORN-PLOWS.

Specification forming part of Letters Patent No. 7,141, dated March 5, 1850.

*To all whom it may concern:*

Be it known that I, ROBERT J. KING, of Lancaster, in the county of Lancaster and State of Pennsylvania, have invented certain new and useful Improvements in Corn and Potato Plows; and I do hereby declare that the following is a full, clear, and exact description of the principle or character which distinguishes them from all other things before known, and of the usual manner of making, modifying, and using the same, together with the accompanying drawings, making a part thereof, of which—

Figure 1 is a projection of the plow. Fig. 2 is a view of the under side thereof.

Many plows have heretofore been made so as to have their double mold-boards expand, and they have been adjusted by various mechanical contrivances; but they are all regulated with some difficulty. They change the angle of the mold-boards, and cause the plow to run differently when the mold-boards are in different positions, as it is impossible to make their curves suited to all angles. Besides this difficulty there is another, that they cannot be expanded and contracted while the plow is running—a great desideratum when the rows of corn are at irregular distances apart in order to cultivate it properly. By my improvement I obviate these objections, first, by moving the wings of the mold-board only, and, secondly, by the apparatus by which this can be effected while the plow is in motion.

The construction is as follows, viz:

A standard and point, $a$, are formed like those of ordinary double-wing plows, and are similarly affixed to the beam $b$, the stationary mold-board $c$ and share $d$ being in one piece with said standard and point.

The movable wings $h$ are securely hinged to the rear edge of the stationary mold-boards, one on each side. These wings and shares are made exactly alike, and they form the termination of the mold-board.

The beam projects backward beyond the standard $a$ nearly to the handles, where it is supported by proper braces $i$ from the inside of the stationary part $c$ of the mold-board, that hold it firmly in place, as clearly shown in Fig. 2.

The handles $k$, formed like those of ordinary plows, are affixed one to each of the stationary mold-boards.

There is a curved projection or loop, $l$, on each of the wings on the inside, in which a nut for a screw is formed. A bar or shaft, $m$, has a right and left screw cut one on each end of it, very coarse threaded, that take into the above-named nuts $l$. The bar $m$ is cranked in its center, as shown in the figure, so as to be easily turned, and it is firmly held in its place and supported by passing through the same braces $i$ that serve to hold the rear end of the beam. By this arrangement the wings are kept in proper relative position, and can be expanded or contracted by simply turning the screw-bar $m$, one turn of which, if properly constructed, will move the rear ends of the wings about one inch, more or less, and by means of a p tman (not shown in the drawings) that extends from the crank up to the handles.

This plow can be contracted and expanded readily within the range of one foot while in motion, which is sufficient for any irregularity in running the rows in planting; and by this means I have found, by actual experiment, a great saving in labor and time, while the work can be performed much more satisfactorily, and the crops greatly improved thereby.

Having thus fully described my improved corn and potato plow, what I claim therein as new, and for which I desire to secure Letters Patent, is—

The movable expanding wings combined and moved substantially in the manner and for the purpose herein described, by means of right and left screws on a cranked shaft that can be turned while the plow is in motion.

ROBT. J. KING.

Witnesses:
 M. CARPENTER,
 JACOB H. GAMBER.